March 8, 1932. J. P. McLIMANS 1,849,022
SLIDING DAMPER FOR OPEN HEARTH FLUES
Filed Oct. 1, 1928 3 Sheets-Sheet 1

Inventor:
John P. McLimans
By D. Anthony Usina
Atty.

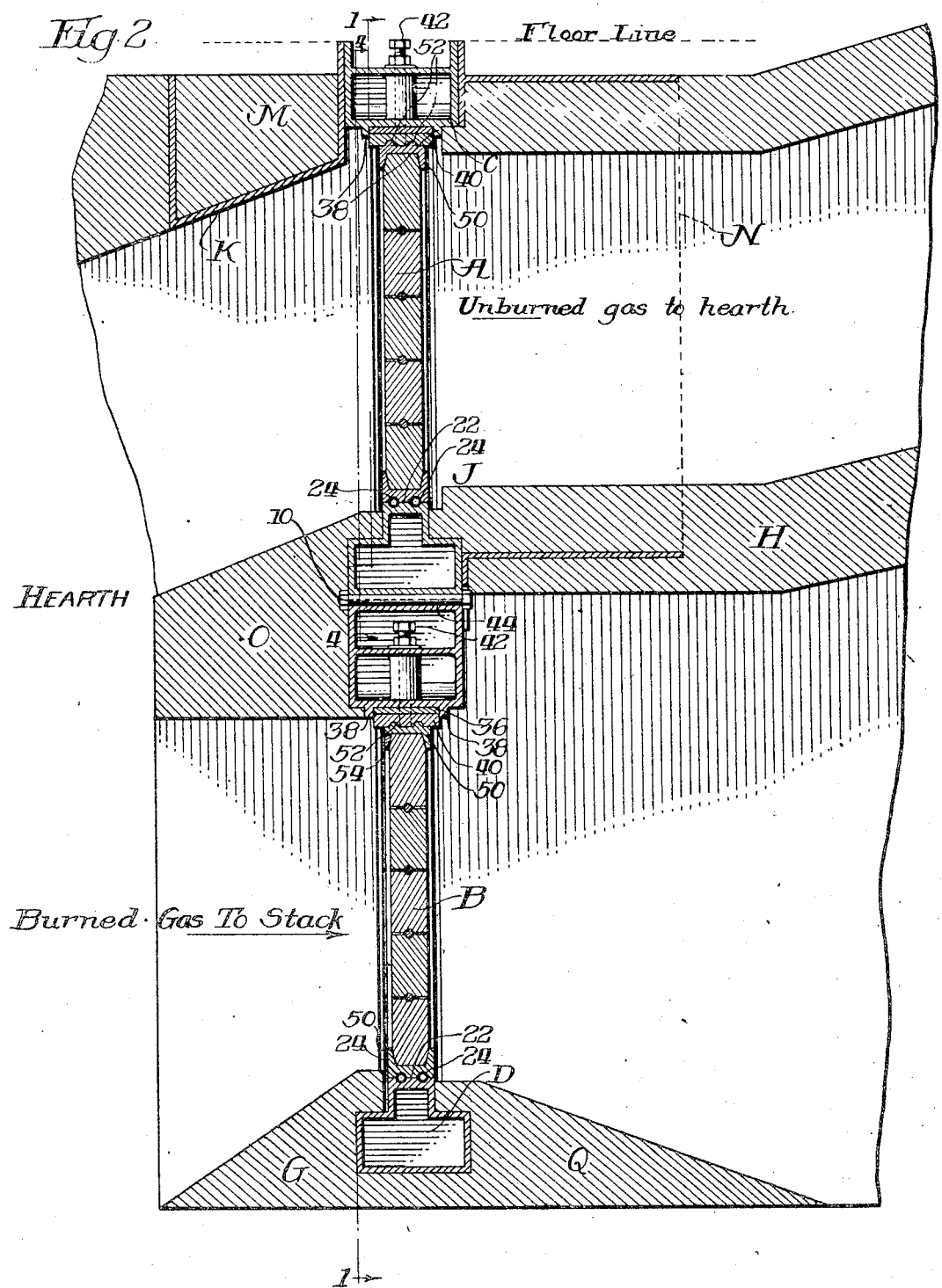

March 8, 1932. J. P. McLIMANS 1,849,022
SLIDING DAMPER FOR OPEN HEARTH FLUES
Filed Oct. 1, 1928  3 Sheets-Sheet 3
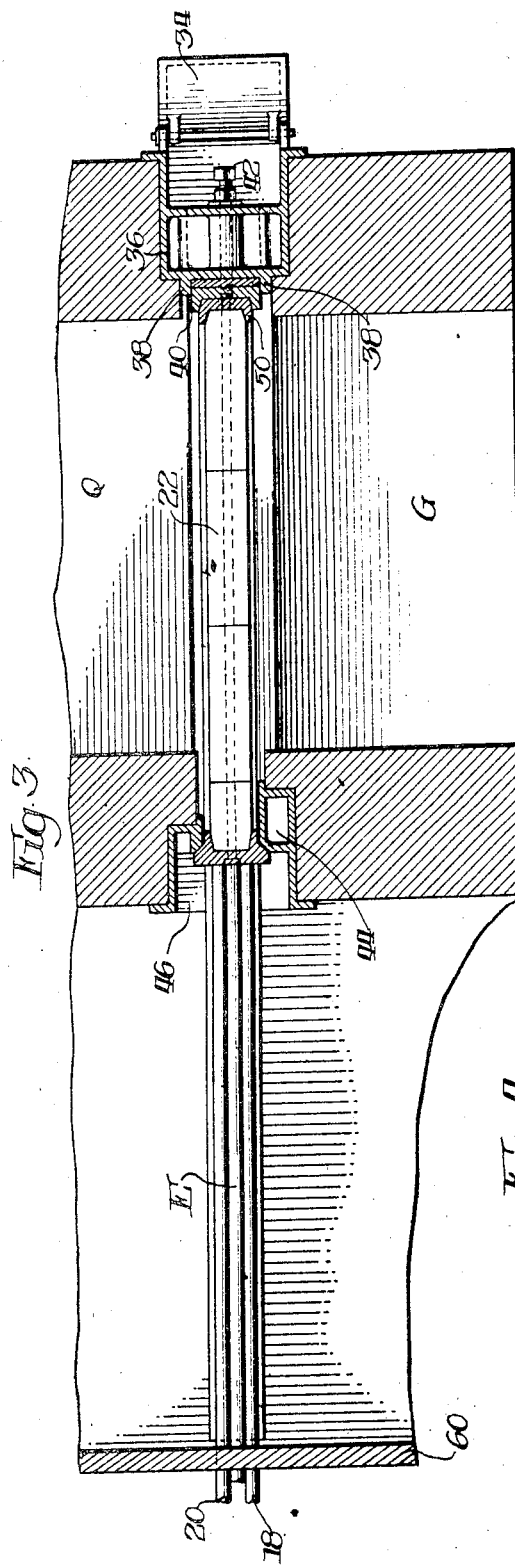
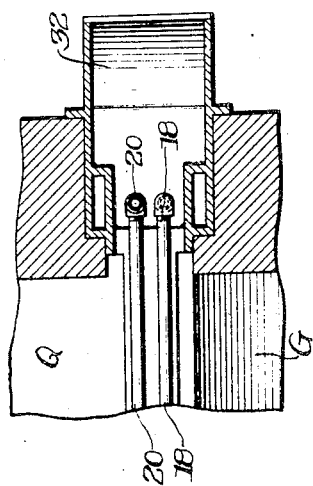
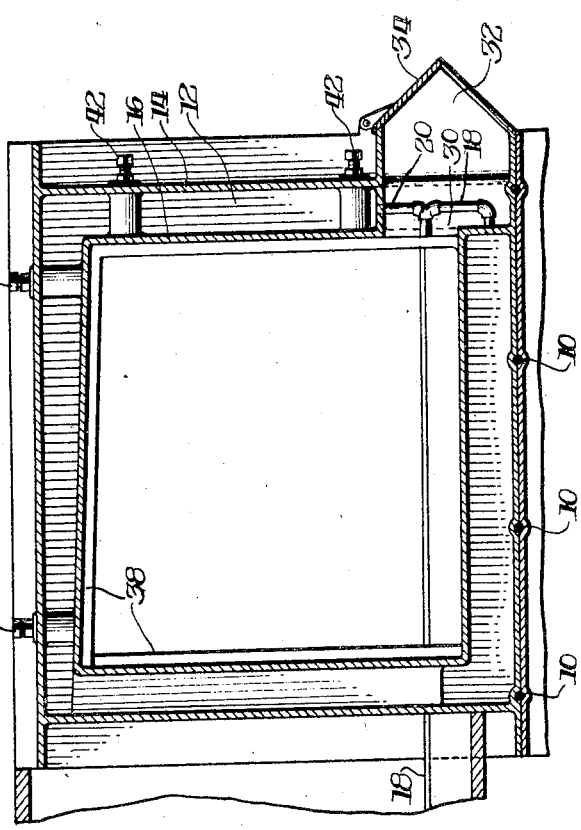
Inventor:
John P. McLimans Patented Mar. 8, 1932

1,849,022

UNITED STATES PATENT OFFICE

JOHN P. McLIMANS, OF DULUTH, MINNESOTA

SLIDING DAMPER FOR OPEN HEARTH FLUES

Application filed October 1, 1928. Serial No. 309,542.

This invention relates to controlling devices such, for example, as dampers and valves, and is illustrated herein as embodied in a device suitable for use in controlling the passage of gases to and from furnaces of the open hearth type.

It is customary today to build open hearth furnaces in the reversible style with an inlet and an outlet at both ends of the furnace and to use these openings alternately; which is to say, that an inlet at one end of the furnace and an outlet at the opposite end of the furnace are used simultaneously until the heat generated in the furnace imparts to the walls of the inlet and outlet their maximum temperatures whereupon these passageways are closed off and the other inlet and outlet are brought into use, allowing the first named passageway to cool. Gases commonly burned in open hearth furnaces of this type are the unburned gases generated in blast furnaces and the fact that they are extremely hot makes it necessary to alternate frequently the use of the inlet passageways and the outlet passageways.

To the end of controlling the flow of gases, it has been customary heretofore to install in each of the passageways a large globe valve of ordinary construction, but inasmuch as the passageways are often three or four feet square, the use of the globe valves requires a great amount of space, and in addition to this, they are quite expensive and are more or less unsatisfactory by reason of the fact that they occasionally jam, or freeze, or otherwise get out of order.

Although, globe valves are generally employed today for the purpose specified, a United States Letters Patent No. 1,596,843, issued on the 17th day of August, 1926, in the name of one McDonnell, discloses the use of what is termed a "Water cooled damper construction" for use in connection with "the so-called 'McKune' system wherein the inlet for the air and gas at the inlet end of the reversing open hearth furnace is small compared with the outlet port area at the opposite end", although the apparatus disclosed in this patent approaches somewhat the present invention, it is non-analogous thereto in practically every respect and could not be used in the manner intended in the present instance inasmuch as it does not obtain a tight or close fit with the walls of the inlet and outlet passageways. In this connection, it is to be pointed out that in the art, the terms "damper" and "valve" have distinct meanings; the first term relating to a device for obstructing, or partially shutting off, the passage of gases and the latter term referring to a device which entirely closes and seals a passageway. Inasmuch as the present invention partakes both the characteristics of a damper and a valve in that it controls the passage of gas yet also seals the passageway, it will for the sake of convenience be termed an "air-tight damper", as contradistinguished from the damper disclosed in the patent mentioned.

An important object of the present invention consists in the provision of an air-tight damper that may be inserted in the inlet or outlet passageway of an open hearth furnace in order to shut off completely the passage of gas therethrough.

A feature of the invention consists in forming the passageways themselves in such a manner that they are particularly suited to accommodate casings or frames with which the dampers are associated. By means of such a provision, the life of the damper and the parts associated therewith are materially prolonged and the efficiency of the damper accordingly increased. In the embodiment of the invention, that is illustrated herein, the passageways are, among other things, formed to shield the exposed metallic frames or casings from the hot gases flowing through the passageways, the advantage of such a provision being apparent.

A further feature of the invention consists in cooling a damper of this character in an extremely efficient and convenient manner. This feature of the invention is carried out by providing a hollow frame or casing for the damper and circulating through it a cooling medium which is supplied through conduits that serve also as means for guiding the damper as it moves into and out of the opening in the frame. The idea of utilizing the conduits for the cooling fluid as guiding means for the dampers is an extremely important aspect of the invention.

Still an additional feature of the invention is found to reside in the provision of means which permit the damper to be cleaned with ease and facility and without disassembling the damper in the least. In the illustrated embodiment of the invention, the damper frame or casing is provided with runways for receiving the outside edges of the damper. During use, there is a tendency for tar, etc., to collect on these runways and to jam down into the corners of the frames in which condition proper closing of the dampers relatively to the frames is prevented. By means of the novel cleaning device, the dust or other sediment so collected drops through an opening into a hopper and may be easily removed therefrom.

In another aspect, a feature of the invention consists in the manner in which the frames and damper are constructed in order to insure an air tight fit existing between the parts. This is accomplished by tapering in a corresponding manner the opening in the damper frame and the damper itself whereby a wedging action takes place between the damper and the frame as the former is moved into a closed position. In addition to this, it is contemplated to provide a gasket made of some suitable material, as, for example, asbestos which will further insure an air tight fit between the damper and the frame.

Other objects and features of the invention will become apparent from a reading of the following specification in the light of the accompanying drawings, in which—

Figure 2 is a view in section taken along the line 2—2 of Figure 1;

Figure 3 is a view in section taken along the line 3—3 of Figure 1;

Figure 4 is another view in section taken along the line 4—4 of Figure 2; and

Figure 5 is a view in section showing the manner in which cooling pipes lead into the valve frame.

Figure 1:
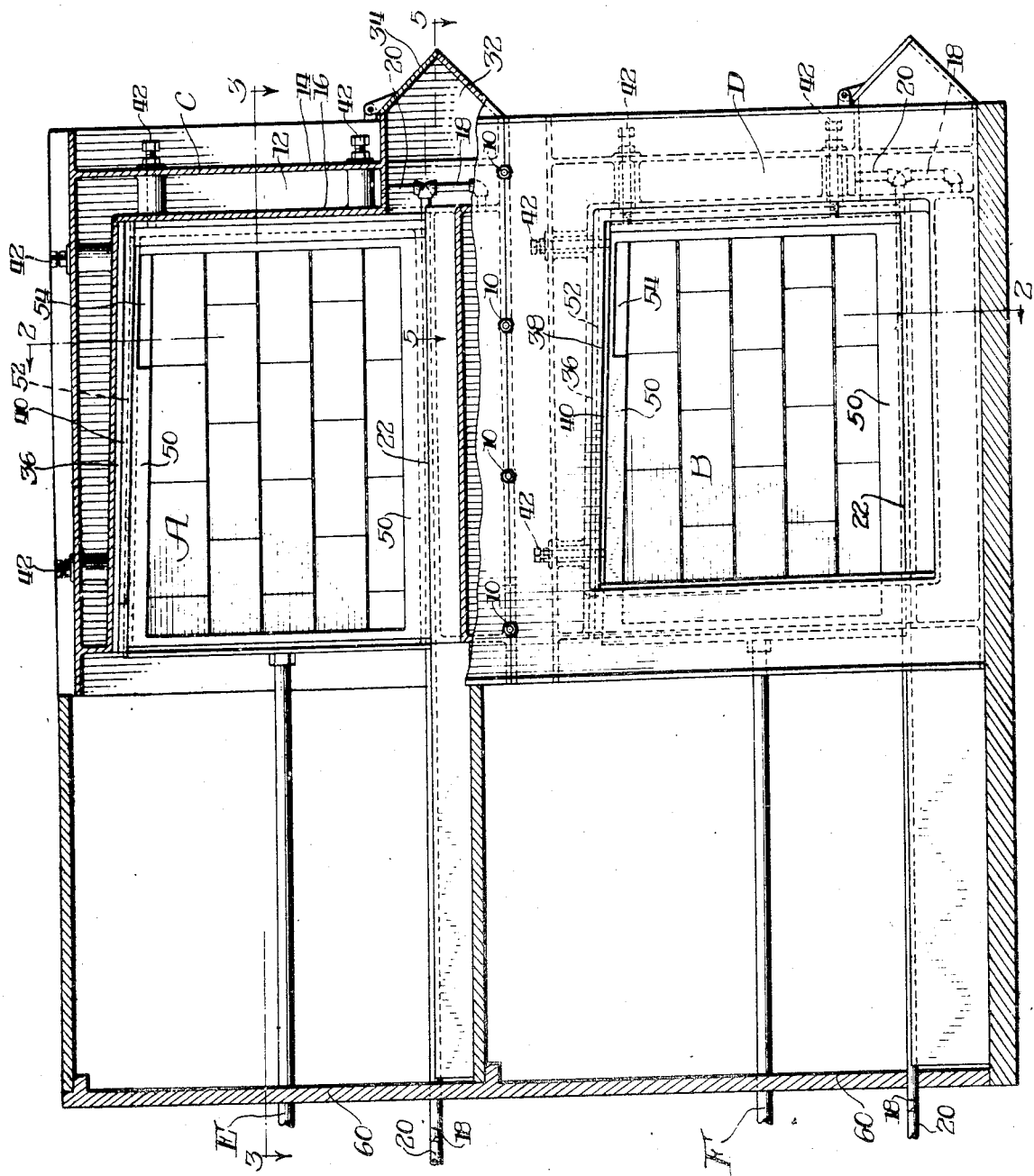
Figure 1 is a view in elevation of a damper assemblage for controlling the passage of gases to a reversible furnace.

As heretofore pointed out, many furnaces in use today are of the type commonly known as reversible. This term designates an arrangement in which a plurality of passages are provided for conducting gases of combustion to the furnace, and a separate plurality for conducting the spent gases away from the furnace, and these passageways are so arranged that they may be used alternately. Thus, when one of the inlet passageways attains a maximum temperature, it may be closed and permitted to cool off, meanwhile the other inlet passageway is opened and the gas is directed into it. To the end of controlling the alternate flow of gases through these passageways, it is customary to provide dampers or valves for closing first one of the passageways and then the other.

As illustrated in the drawings, the novel damper arrangement comprises, generally speaking, an upper damper "A" for controlling an inlet passageway, and a lower damper "B" for controlling an outlet passageway, mounted for horizontal sliding movement in frame works "C" and "D" respectively, and adapted to be slid back and forth by manual or mechanical means applied to operating levers "E" and "F". It will be observed that Figure 2 of the drawings has legends applied thereto in order to show the course pursued by the gas in entering the hearth and in leaving the hearth to go to the stack, and it will likewise be understood that a similar arrangement of passageways obtains at the opposite end of the hearth, whereby an inlet damper at one end and an outlet damper at the opposite end may be opened simultaneously and used alternately with an outlet damper at the first named end and an inlet damper at the second named end.

Turning now to the construction of the passageways for accommodating the dampers, it will be observed that the bottom of the outlet passageway G which leads to the lower damper is paved upwardly to a point higher than the line of junction between the damper B and the frame D, whereby the outwardly flowing gases are baffled upwardly away from the metallic damper frame D as they flow to the stack, and hence the paving serves as a shield or guard for the damper frame. In a similar manner, the lower wall H of the inlet passageway is paved at J higher than the line of junction between the upper damper A and the damper frame or casing C, whereby the inwardly rushing gases will not strike upon the exposed portion of the damper frame. To assist in supporting the pasageways leading to and from the dampers, there is provided a lintel K filled with a suitable material M and a cylindrical or rectangular casing N which is flanged to the exterior of the upper damper casing C. It will be seen that these members assist materially in supporting the upper and lower walls and it will also be understood that if desired similar members may be employed in supporting the walls O and Q which are on the lower outlet side of both dampers.

The general mounting of the dampers having now been described, attention will next be directed to the construction of the damper frame and the manner in which it is cooled. The upper and lower damper frames are very similar in design and construction, and in fact they are sufficiently alike that description of one suffices for both, it being pointed out beforehand that the upper damper is surmounted upon the lower damper in the manner shown in Figure 1, and the two are joined together by means of bolts 10 which fit within saddles or grooves formed half in the upper and half in the lower frame and brought into registry with one another when the two frames are surmounted in the proper manner.

As shown in Figure 4, the damper casing, or frame, comprises a hollow metallic frame 12 which may be made in a single piece casting. The hollow character of the frame results from providing a plurality of rectangular walls 14 and 16 that are held in spaced relationship by means of the side walls of the damper frame and by means of webs that are provided at suitable localities. The damper frames are adapted to be cooled by means of water or other suitable fluid circulated through the hollow openings formed in the dampers, and to this end each damper is provided with a plurality of conduits 18, 20, one of which is arranged to conduct water into the hollow opening in the damper casing or frame and the other of which is arranged to lead the circulated water away from the frame to a point of discharge. A guideway or runway 22 is formed along the lower inner side wall of the damper frame as shown in Figures 2 and 3 and the runway is provided with longitudinally extending grooves in which the lower portions of the fluid conduits 18 and 20 are adapted to repose leaving their upper portions exposed and protruding somewhat above the upper surface of the runway. The purpose of mounting the conduits in this manner on the runway 22 is to provide guiding means for the damper as it moves from an open to a closed position, and it will be seen that by forming complementary grooves 24 in the bottom of the bottom edge of the damper, as shown in Figure 2, for receiving the exposed portions of the conduits 18 and 20, a firm and very close fitting arrangement for guiding the damper and holding it in proper registry with the opening has been obtained.

Thus, a suitable cooling medium is circulated through the hollow frame and the conduits for conducting the fluid to the frame serve also as guideways for the dampers.

During use of the dampers, it will be found that dirt, tar, or some other sediment will collect upon the exposed runway 22 with the result that when the damper is moved into a closed position it will loosen the dirt, tar, etc., from the runway and push it ahead until it is finally jammed between the damper and frame at the end of the runway. As this deposit of sediment continues to collect, it will eventually interfere with the proper operation of the damper, unless some provision is made for removing the deposit periodically. Accordingly, the damper frame is provided with a slotted opening 30 which communicates with a hopper 32, a door 34 being provided to afford access to the hopper. With such a provision, the damper tends to push sediment that is collected on the runway forwardly through the opening and into the hopper from which it may be removed through the door 34, or if the sediment is not pushed through the opening as it collects, it may be removed manually through the door 34.

It is an important consideration of the present invention, that the dampers be airtight in construction in order entirely to prevent the passage of gas through the passageways and to this end, the portions of the damper frame which are engaged by the side edges of the damper are provided with a suitable packing, or gasket, of asbestos or other deformable heat resisting material. As shown in Figures 1, 2, and 3, the forward side, and the top side, of the damper opening is provided with a layer of asbestos which is retained in place by means of guideways 38 formed on damper frame and through the further provision of sills or seating members 40 against which the side edges of the damper are adapted to rest when the damper occupies a closed position.

The damper frame is provided with means for adjusting the sills 40 relatively to the frame in order to compensate for a certain amount of compression that will take place in the asbestos packing, and to permit replacement of the packing, and, as illustrated, the means for permitting this comprise adjusting bolts 42, the heads of which are exposed wherever possible to render them accessible, attention being called at this time to the fact that the top portion 44 (Figure 2) of the lower frame has an open top side except for the saddles which span the opening and receive the assembling bolts 10.

Before passing on to the manner in which the damper itself is constructed, it is desired to call attention to the fact that, as shown in Figure 3, the opening in the damper frame through which the damper 22 passes in moving into a closed position, is water cooled on one side by means of a jacket 44 and on the other side is air cooled by means of a pocket 46, it being understood that if found desirable a cooling jacket may be provided on the opposite sides of the opening, or cooling pockets may be provided as desired.

The damper construction is best shown in Figures 1 and 2 and comprises, generally speaking, a cast metal frame 50 provided with longitudinal grooves on its lower edge for receiving the exposed portion of the conduits 18 and 20, and with ribs 52 projecting from the top edge for engaging within complementary grooves formed in the lower side of the upper sill member 40. The metallic frame which comprises the outer portion of the damper is provided with inwardly extending flanges which function as braces or guides for holding the body of the damper in proper position, and, as shown in Figure 1, the frame is cut away at the upper righthand corner as indicated by the reference numeral 54. The damper is composed of bricks or other suitable material having high heat resisting qualities and it is intended that these bricks be laid within the frame and between the flanges formed upon opposite sides of the frame, the edges of the bricks which come in contact with the flanges being of tapering formation to permit their insertion therebetween. The purpose in providing the cut away portion is to permit the last brick to be placed in the damper and it is contemplated holding this last brick in place by means of a filler piece which may be welded in place whereupon there is provided a damper construction which in and of itself forms a hermetic seal.

To the end of still further insuring a hermetic fit between the damper and the surrounding frame, the opening in the frame tapers slightly in the direction in which the damper moves in closing and the damper itself is tapered accordingly, by reason of which fact, a wedging action takes place between the frame and the damper as the latter is moved from an open to a closed position.

In the use of the construction, the dampers A and B become very hot even though they are closed and if suddenly exposed to atmospheric temperature would very probably warp or crack. In order to prevent this, a hood 60 is mounted to the left of the dampers as viewed in Figure 1, to receive such members when they occupy an open position.

Although the invention has been illustrated and described herein with particular reference to reversible furnaces, it is to be appreciated that the damper may be used in other similar and analogous organizations or that it may in some instances, if desired, be employed as a valve, and it is also to be understood that the invention contemplates incorporation therein of changes and modifications which will, from time to time, become apparent to those skilled in the art.

Having thus described my invention what I claim as new and desire to secure by United States Letters Patent is:

1. A damper construction comprising, in combination, a hollow rectangular frame provided with a central opening, means for applying a cooling medium to the hollow frame, said means comprising a conduit extending lengthwise of one side of the rectangular frame adjacent to the central opening, and a damper mounted for movement into a position to close the central opening, said damper being provided with a groove for interfitting engagement with the conduit for the cooling medium.

2. A water cooled damper comprising, in combination, a hollow frame adapted to engage the edges of a damper member, and means for circulating water in the hollow frame, said frame and said damper member being of corresponding trapezoidal formation whereby a wedging action is procured upon the damper being moved to a closed position in the frame.

3. A water cooled damper construction comprising, in combination, a hollow frame having a trapezoidal seat portion, means for circulating a cooling medium through the hollow frame, and a damper member mounted for sliding engagement with the frame and adapted to fit snugly upon the trapezoidal seat.

4. A water cooled damper construction comprising, in combination, a hollow frame having a central opening therein, a trapezoidal seat portion formed adjacent to the central opening therein, and a damper of trapezoidal formation in its lower portion mounted for sliding engagement with the seat, said seat and said damper being of such formation as to taper in the direction in which the damper moves in closing.

5. A water cooled damper construction comprising, in combination, a hollow frame having a trapezoidal seat portion, a conduit associated with the seat portion and adapted to provide a cooling medium to the hollow frame, and a damper of trapezoidal formation mounted for movement into engagement with the seat portion, said conduit being adapted to serve as a guideway to control the movement of the damper in closing.

6. A damper construction comprising, in combination, a frame having a central opening, a damper mounted for movement relatively to the frame to close the central opening, a plurality of runways formed on the frame adjacent to the central opening to receive the side edges of the damper, a plurality of sills adjustably connected to the frame and heat resisting gaskets interposed between the sills and the frame.

7. A water cooled damper construction comprising, in combination, a hollow frame member having a central opening therein, flat walls formed adjacent to the central opening, a plurality of gaskets carried by the flat walls of the frame, and means for adjusting the gasket members relatively to the frame.

8. A water cooled damper construction comprising, in combination, a hollow frame member having a central opening therein, flat walls formed adjacent to the central opening, a plurality of gaskets carried by the flat walls of the frame, and means for adjusting the gasket members relatively to the frame, said damper frame being provided with a plurality of openings which permit access to the adjusting means.

Signed at Duluth, Minnesota, this 24th day of Sept., 1928.

JOHN P. McLIMANS.